US012643722B2

(12) United States Patent
Busch

(10) Patent No.: US 12,643,722 B2
(45) Date of Patent: Jun. 2, 2026

(54) CONTAINER SYSTEM AND BRACKET THEREFOR

(71) Applicant: BUSCH SYSTEMS INTERNATIONAL INC., Barrie (CA)

(72) Inventor: Craig Busch, Barrie (CA)

(73) Assignee: BUSCH SYSTEMS INTERNATIONAL INC., Barrie (CA)

( * ) Notice: Subject to any disclaimer, the term of this patent is extended or adjusted under 35 U.S.C. 154(b) by 0 days.

(21) Appl. No.: 18/986,859

(22) Filed: Dec. 19, 2024

(65) Prior Publication Data

US 2025/0304339 A1 Oct. 2, 2025

Related U.S. Application Data

(60) Provisional application No. 63/573,131, filed on Apr. 2, 2024.

(51) Int. Cl.
*B65D 55/14* (2006.01)
*B65F 1/16* (2006.01)

(52) U.S. Cl.
CPC ...... *B65D 55/14* (2013.01); *B65D 2251/1025* (2013.01); *B65F 1/1615* (2013.01)

(58) Field of Classification Search
CPC ........ B65D 55/14; B65D 55/02; B65D 45/16; B65F 1/1615; B65F 1/16; B65F 1/065; B65F 1/06; Y10S 220/9081; Y10S 220/908
USPC .. 220/324, 315, 495.08, 495.06, 908.1, 908; 292/271; 70/162, 160, 159, 158
See application file for complete search history.

(56) References Cited

U.S. PATENT DOCUMENTS 6,902,080 B2 * 6/2005 Busch .................. B65F 1/1615 70/164
8,870,014 B2 * 10/2014 Lin .......................... G03F 1/66 220/322
2011/0100995 A1 * 5/2011 Dunn ....................... B65F 7/00 220/495.01
2016/0083186 A1 * 3/2016 Wright ................. B65F 1/1615 220/324

* cited by examiner

*Primary Examiner* — Robert J Hicks

(57) ABSTRACT

The present invention is a container system comprising: a container having an opening with a rim; a lid for covering the opening, the lid being movable between an open position and a closed position in which the lid covers the opening; and a bracket secured to the rim, the bracket having a raised portion spaced from the rim and defining an open chamber between the raised portion and the rim, wherein the raised portion includes a bracket aperture that is positioned to be aligned with a corresponding lid aperture in the lid when the lid is in the closed position, and wherein a gap in the raised portion extends from the bracket aperture to an edge of the raised portion.

23 Claims, 21 Drawing Sheets

CONTAINER SYSTEM AND BRACKET THEREFOR

CROSS-REFERENCE TO RELATED APPLICATION

The present application claims the benefit of U.S. Provisional Patent Application Ser. No. 63/573,131 filed on Apr. 2, 2024, entitled CONTAINER SYSTEM AND BRACKET THEREFOR, which is incorporated herein by reference in its entirety.

FIELD

The present disclosure relates to container systems and to a bracket for installation of locking mechanisms for such container systems.

BACKGROUND

Containers for receiving waste and/or recycling may be locked when closed to inhibit access to materials deposited in the containers. While a container is locked, matter may be deposited into the container but typically cannot be retrieved from the container without first unlocking the container. Known locking types may include use of a pad lock or a slam lock. Currently, containers are prepared by a manufacturer to be sold with either a lock or a pad lock mechanism. Different types of locking mechanisms are typically not interchangeable such that a particular container is typically compatible only with a corresponding particular type of locking mechanism.

Different use applications for a container or user preferences may require different types of locking mechanisms to be used for the same container based on the application/preference. As such, there is a desire for improved ways to interchange locking mechanisms for a particular container and/or providing a container system that may allow for more than one type of locking mechanism to be installed. Additionally, it may be desirable to quickly and efficiently configure a large number of containers for use with desired locking mechanisms.

BRIEF DESCRIPTION OF THE DRAWINGS

Embodiments will be described, by way of example only, with reference to the accompanying figures wherein.

DETAILED DESCRIPTION

Figure 1A:
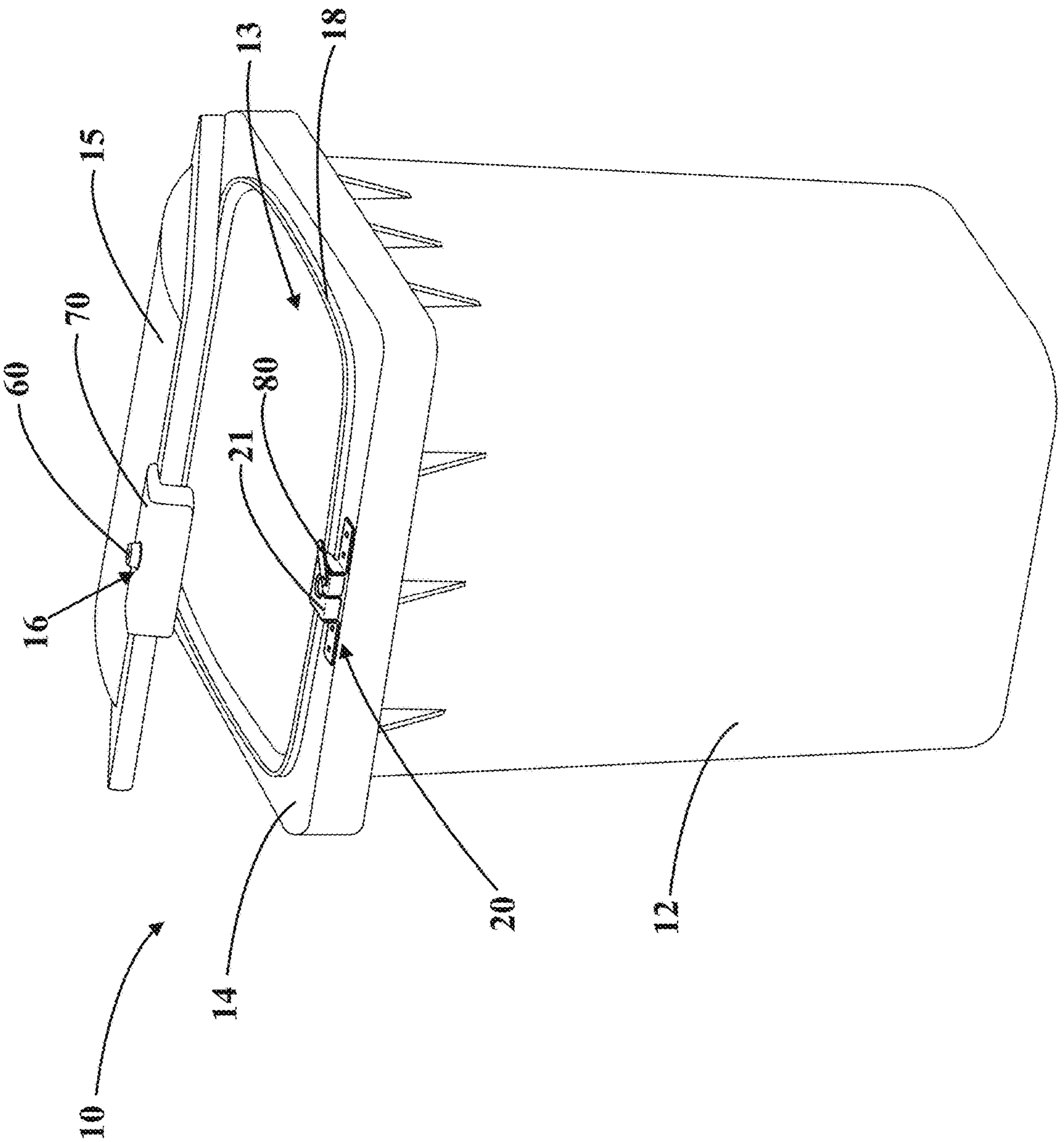
FIG. 1A is a perspective view of a container system according to embodiments of the present disclosure.
Figure 1B:
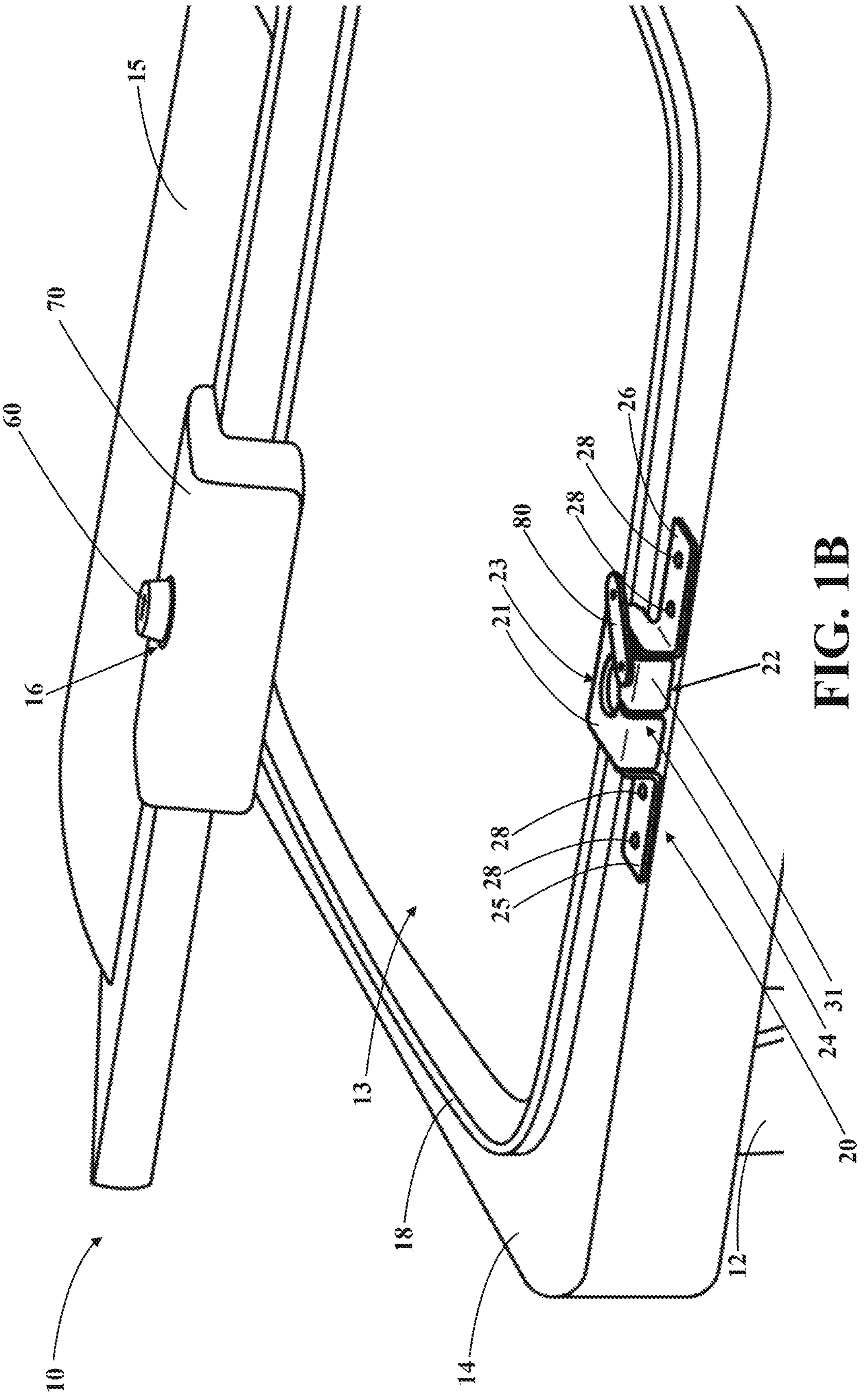
FIG. 1B is an enlarged partial perspective view of the system of FIG. 1A.

FIGS. 1A and 1B show a container system 10 according to embodiments of the present disclosure. In the embodiment shown, the system 10 includes a container 12 having an opening 13 with a rim 14. Rim 14 surrounds opening 13. In the illustrated embodiment, rim 14 surrounds the entire opening 13. In other embodiments, rim 14 may surround only a portion of opening 13. At a minimum, rim 14 would run along an edge of opening 13 for receiving a system as disclosed herein.

Container 12 may hold matter intended to be disposed of. In particular, container 12 may be configured to hold confidential material to be later shredded or otherwise destroyed. Thus, it may be desirable to limit access to the contents of container 12 until an operator is prepared to dispose of the contents of container 12.

The system includes a lid 15 to cover opening 13. In the embodiment shown, lid 15 is rotatably coupled to a rear portion of rim 14 of container 12, allowing lid 15 to be moved between an open position and a closed position in which lid 15 rests on at least a part of rim 14 and covers opening 13. In FIGS. 1A and 1B, lid 15 is shown in a partially open position such that lid 15 is partially rotated away from opening 13 thereby partially exposing opening 13. Lid 15 may be configured to rotate entirely out of the way to allow the contents of container 12 to be disposed of. While one shape of container 12, opening 13, rim 14 and lid 15 is shown, other shapes are possible and within the scope of the present disclosure.

A bracket 20 may be secured to rim 14. In the embodiment shown, bracket 20 is secured to a front portion of rim 14, and is centered along the front portion of rim 14. In other embodiments, bracket 20 may be installed or secured to a different portion of rim 14 or even a different portion of container 12.

Bracket 20 includes a raised portion 21 that is spaced apart from container 12. In the illustrated embodiment, raised portion 21 is spaced from rim 14. Raised portion 21 defines an open chamber 22 between raised portion 21 and container 12, in particular rim 14. In the illustrated embodiment, open chamber 22 is generally shaped as a rectangular prism. Other shapes and volumes for open chamber 22 are possible and are within the scope of the present disclosure.

Raised portion 21 includes a bracket aperture 23. Bracket aperture 23 is positioned to be aligned with a corresponding lid aperture 16 in lid 15 when lid 15 is in the closed position. In the illustrated embodiment, bracket aperture 23 is generally circular and centered on raised portion 21. In other embodiments, bracket aperture 23 may be shaped different and/or be positioned elsewhere.

Figure 6:
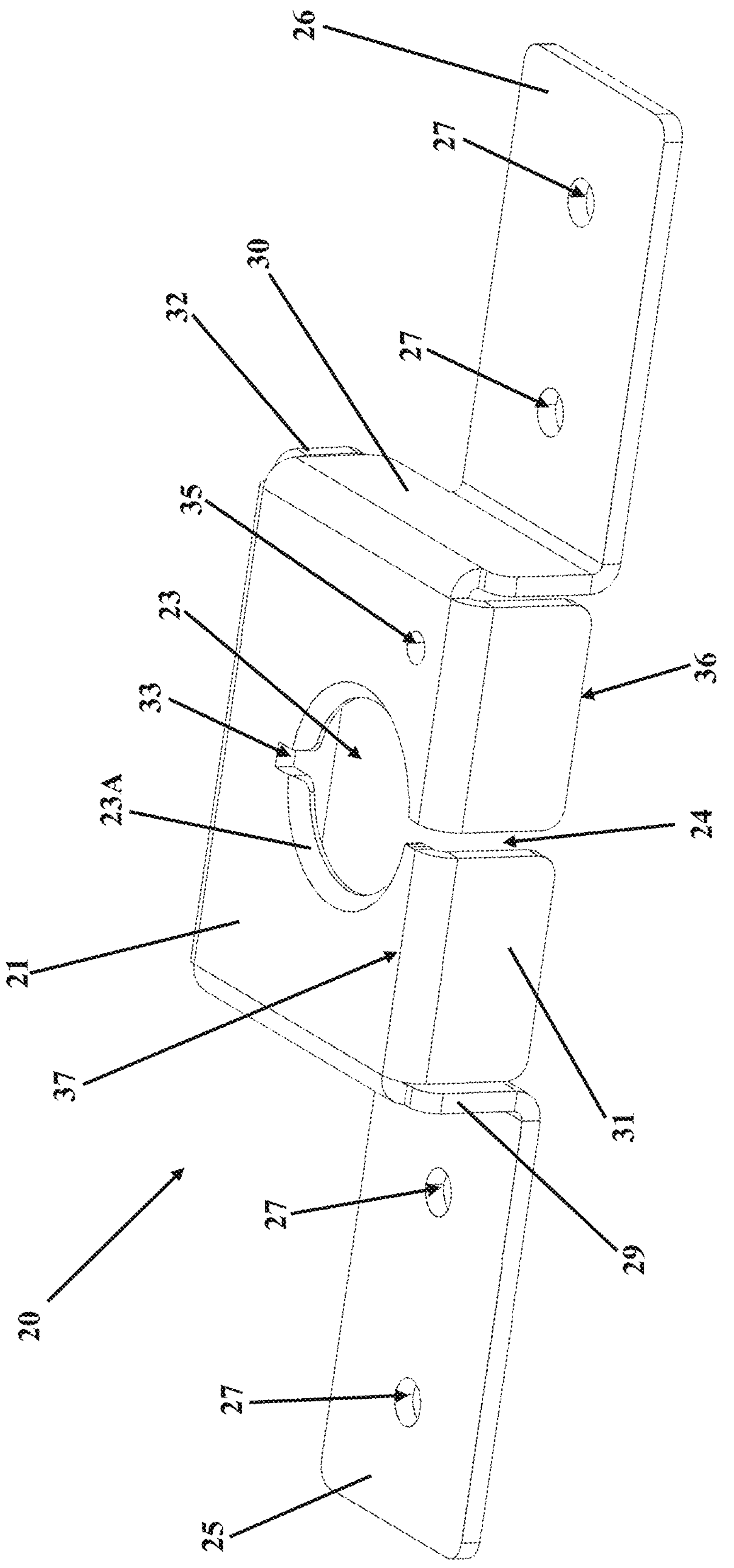
FIG. 6 is a top front perspective view of a bracket of the system of FIG. 1A.
Figure 7:
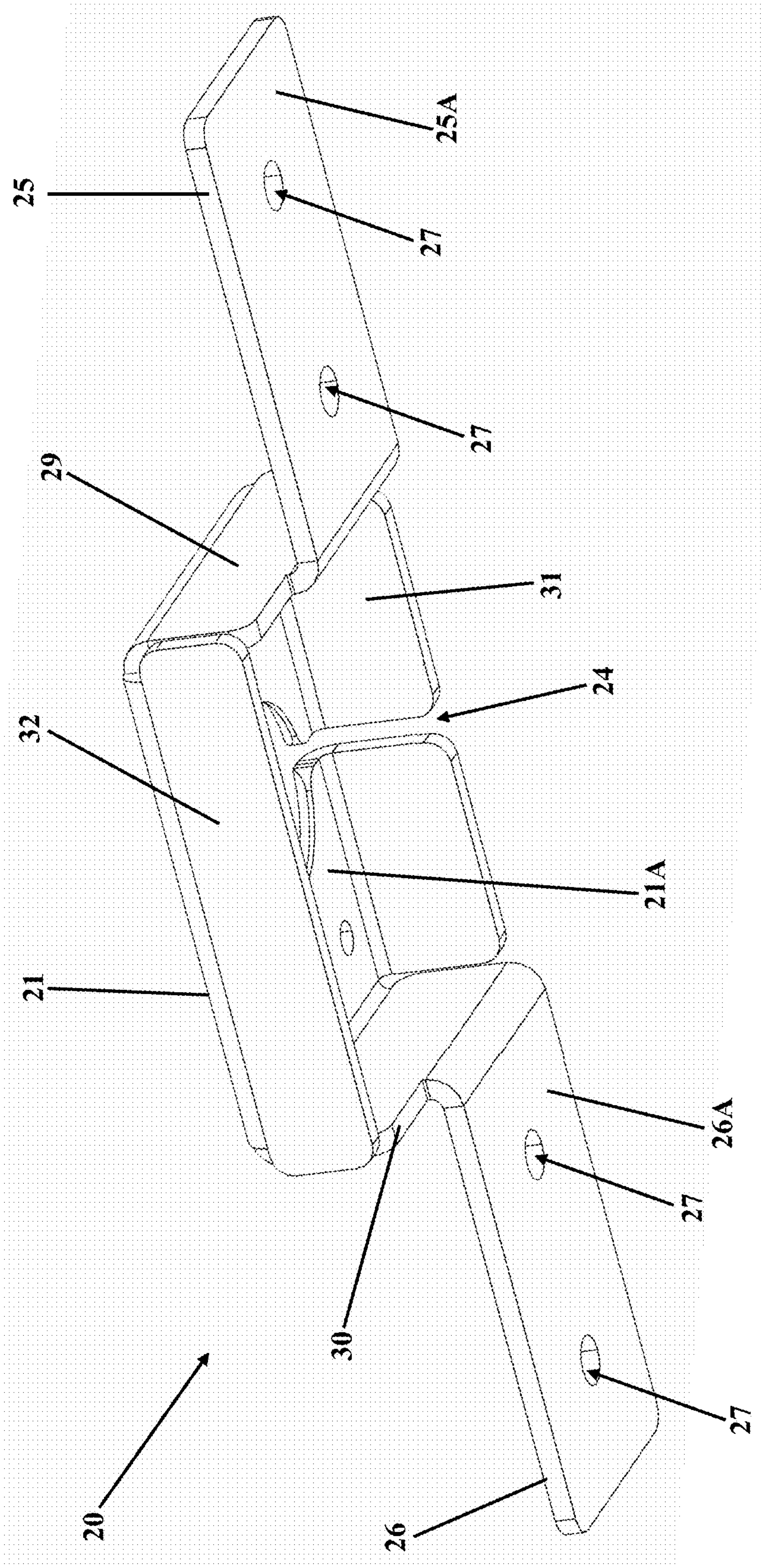
FIG. 7 is a bottom rear perspective view of the bracket of FIG. 6.
Figure 9:
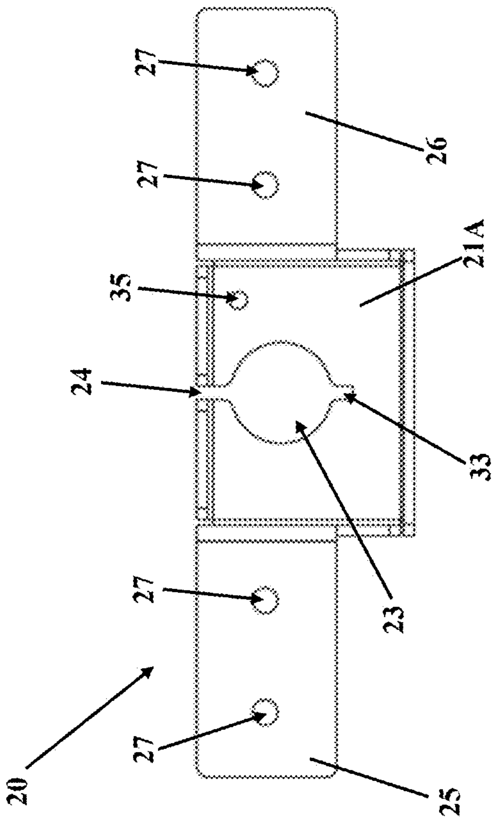
FIG. 9 is a bottom view of the bracket of FIG. 6.
Figure 8:
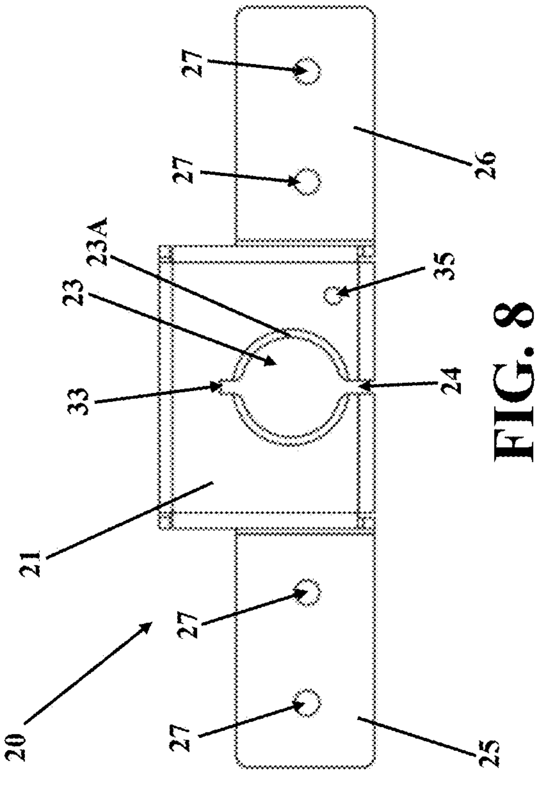
FIG. 8 is a top view of the bracket of FIG. 6.
Figure 12:
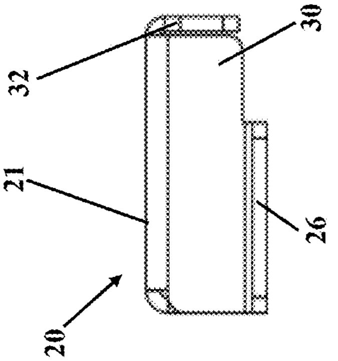
FIG. 12 is a right side view of the bracket of FIG. 6.
Figure 11:
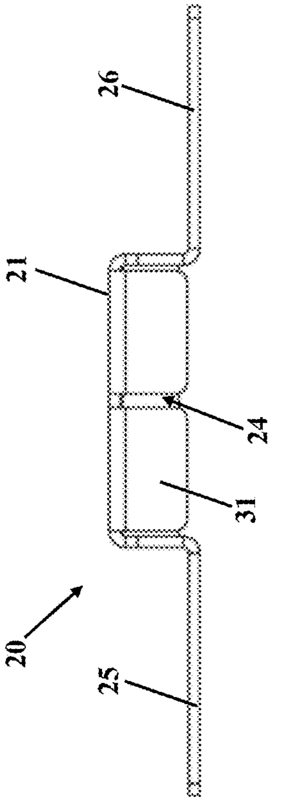
FIG. 11 is a front view of the bracket of FIG. 6.
Figure 10:
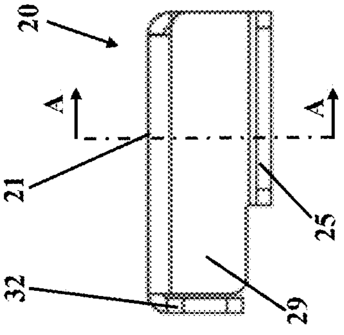
FIG. 10 is a left side view of the bracket of FIG. 6.
Figure 13:
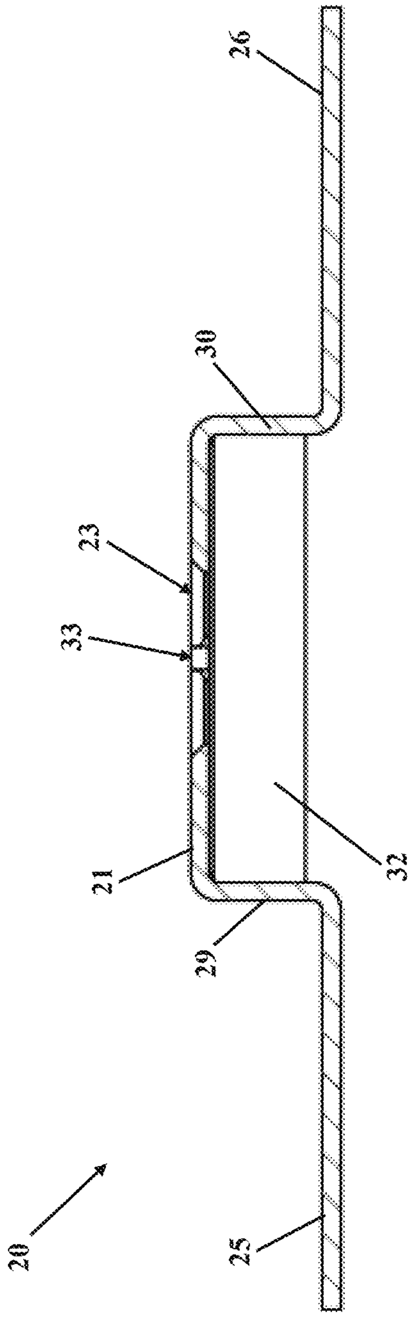
FIG. 13 is a cross-sectional view of the bracket of FIG. 6 taken along line A-A shown in FIG. 10.
Figure 15:
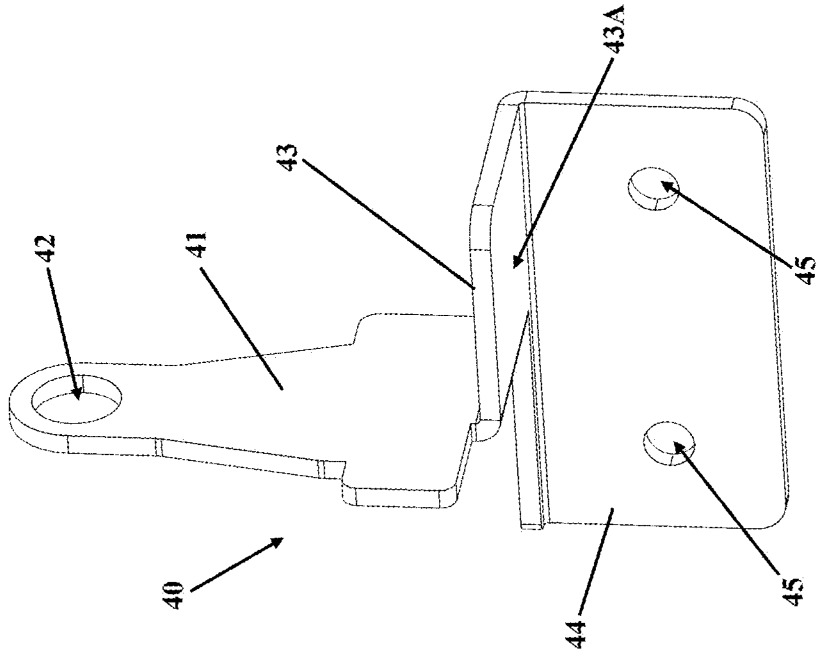
FIG. 15 is a bottom rear perspective view of the hasp plate of FIG. 14.
Figure 14:
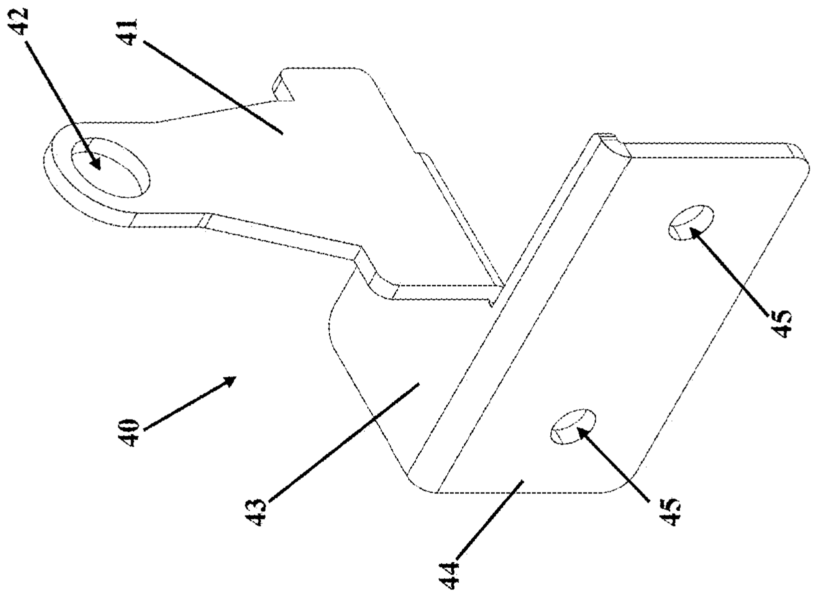
FIG. 14 is a top front perspective view of a hasp plate of the system of FIG. 2.
Figure 16:
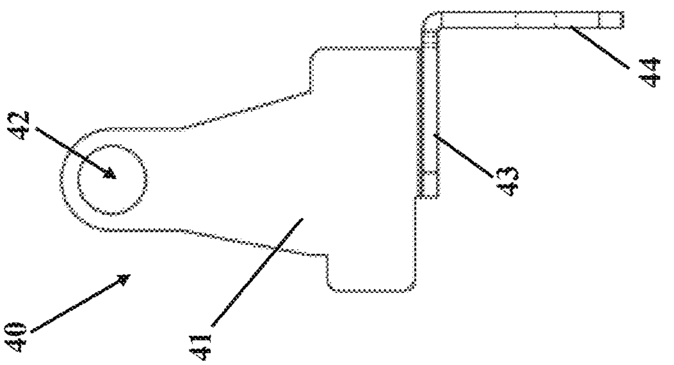
FIG. 16 is a left side view of the hasp plate of FIG. 14.
Figure 17:
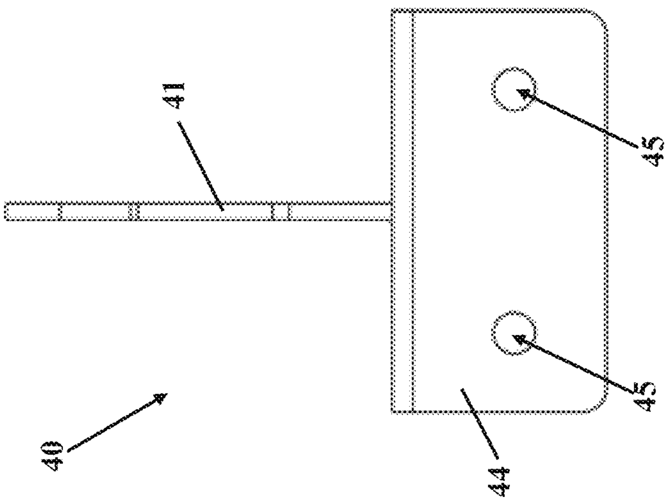
FIG. 17 is a front view of the hasp plate of FIG. 14.
Figure 18:
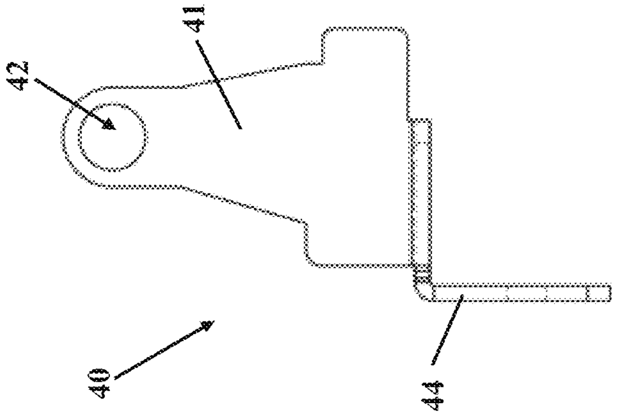
FIG. 18 is a right side view of the hasp plate of FIG. 14.
Figure 20:
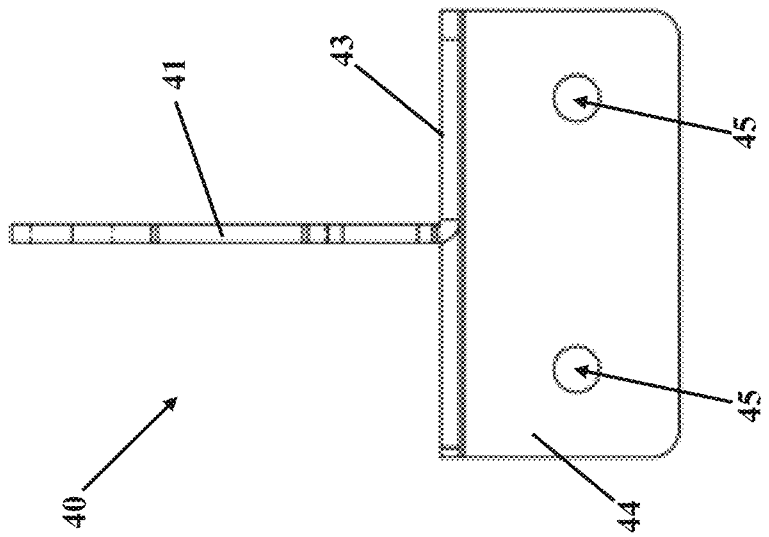
FIG. 20 is a rear view of the hasp plate of FIG. 14.
Figure 19:
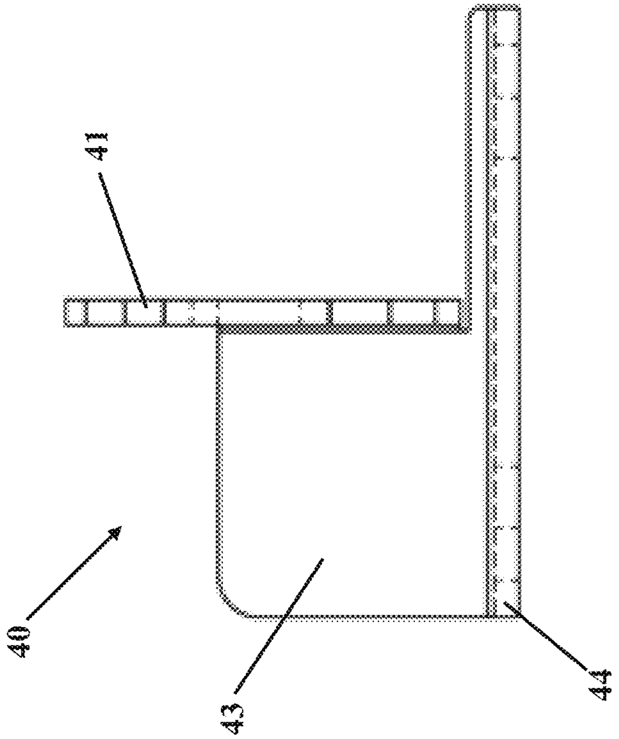
FIG. 19 is a bottom view of the hasp plate of FIG. 14.

Raised portion 21 also includes a gap 24. Gap 24 extends through raised portion 21 from bracket aperture 23. Thus, gap 24 provides communication between bracket aperture 23 and an exterior of bracket 20. In the illustrated embodiment, gap 24 extends from bracket aperture 23 to an edge of raised portion 21 (e.g. a front edge 37 of raised portion 21 as shown in FIG. 6). In other embodiments, gap 24 may extend from bracket aperture 23 to another portion of raised portion 21. There may be multiple gaps 24. Gap 24 may be comprised of multiple sections. In the illustrated embodiment, gap 24 is configured as a linear slot. In other embodiments, gap 24 may be wider and/or not linear. For example, in some embodiments, gap 24 may be curved or have another suitable shape.

Figure 2:
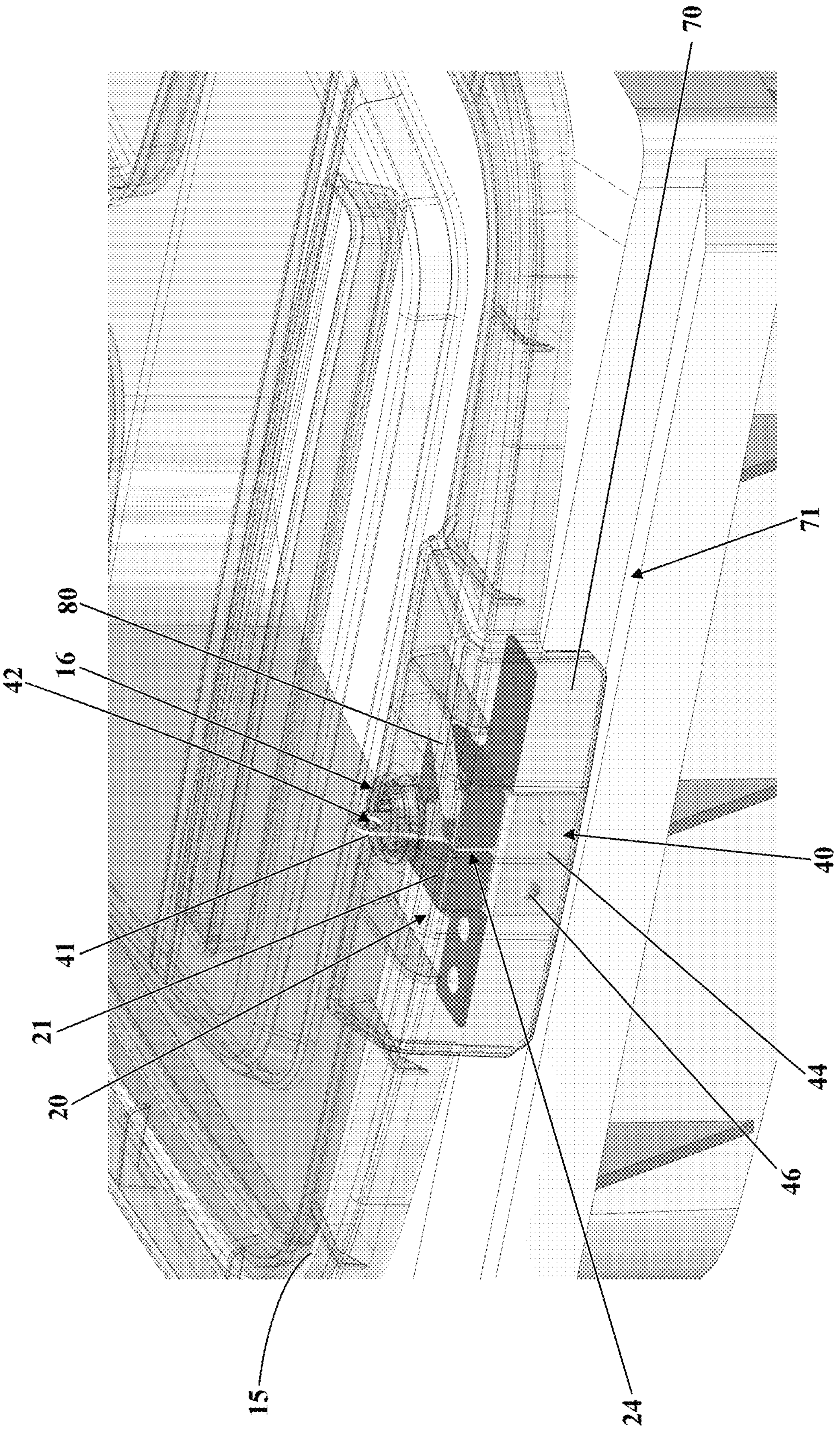
FIG. 2 is a perspective view of a container system according to an embodiment of the present disclosure with the lid being shown closed and transparent.
Figure 3:
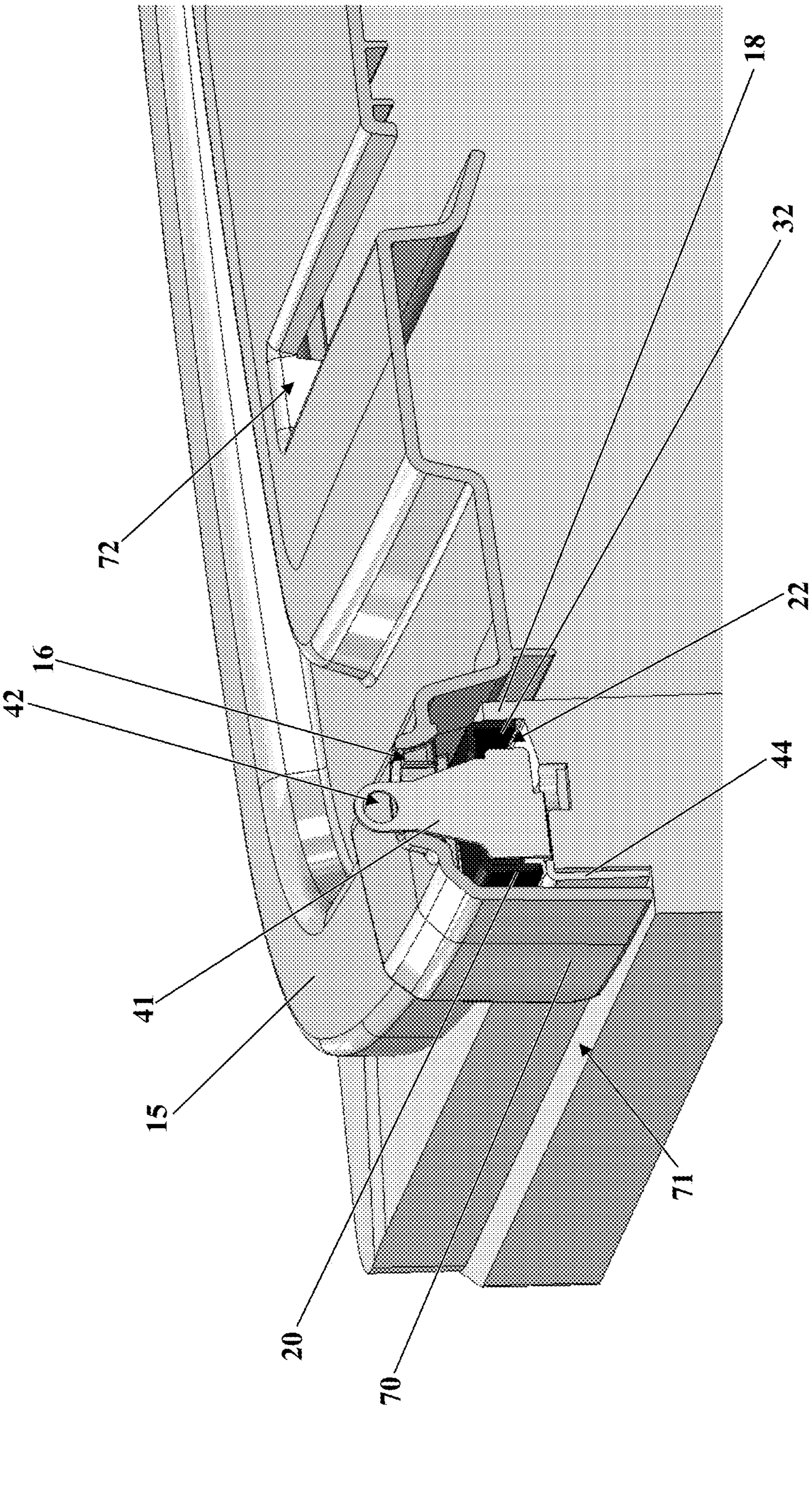
FIG. 3 is a cross-sectional perspective view of the system of FIG. 2 with the lid being shown closed.

System 10 may also include a hasp plate 40. Hasp plate 40 may be used to allow container 12 to be locked with a pad lock. Hasp plate 40 includes a staple portion 41. Hasp plate 40 may be positioned within open chamber 22 as shown in FIGS. 2 and 3. To position hasp plate 40 within open chamber 22, staple portion 41 may be passed through gap 24 of raised portion 21. Upon hasp plate 40 being fully positioned within open chamber 22, staple portion 41 extends through bracket aperture 23. When lid 15 is in the closed position, lid aperture 16 is aligned with bracket aperture 23 and staple portion 41 extends through lid aperture 16. Thus, staple portion 41 is sized and dimensioned to sufficiently extend through lid aperture 16 when lid 15 is in the closed position. Once hasp plate 40 is positioned within open chamber 22, hasp plate 40 may be secured to container 12. In some embodiments, hasp plate 40 is removably secured to container 12.

Access to matter deposited within container 12 may be hindered by locking lid 15 to container 12. For example, lid 15 may be locked closed to inhibit access to confidential documents held by container 12. As another example, lid 15 may be locked closed to inhibit wildlife such as bears from accessing food waste held by container 12.

When lid 15 is closed and staple portion 41 of hasp plate 40 extends at least partially through lid aperture 16, lid 15 may be locked closed by engaging a lock with staple portion 41 and locking the lock. The locked lock at least partially prevents opening of lid 15. For example, the lock may comprise a padlock. A shackle of the padlock may extend through a staple opening 42 of staple portion 41. Locking the padlock prevents uncoupling of the shackle from staple portion 41 and at least partially prevents opening of lid 15 thereby locking lid 15 closed. Other lock configurations engageable with staple portion 41 are possible and included within the present disclosure.

Figure 4:
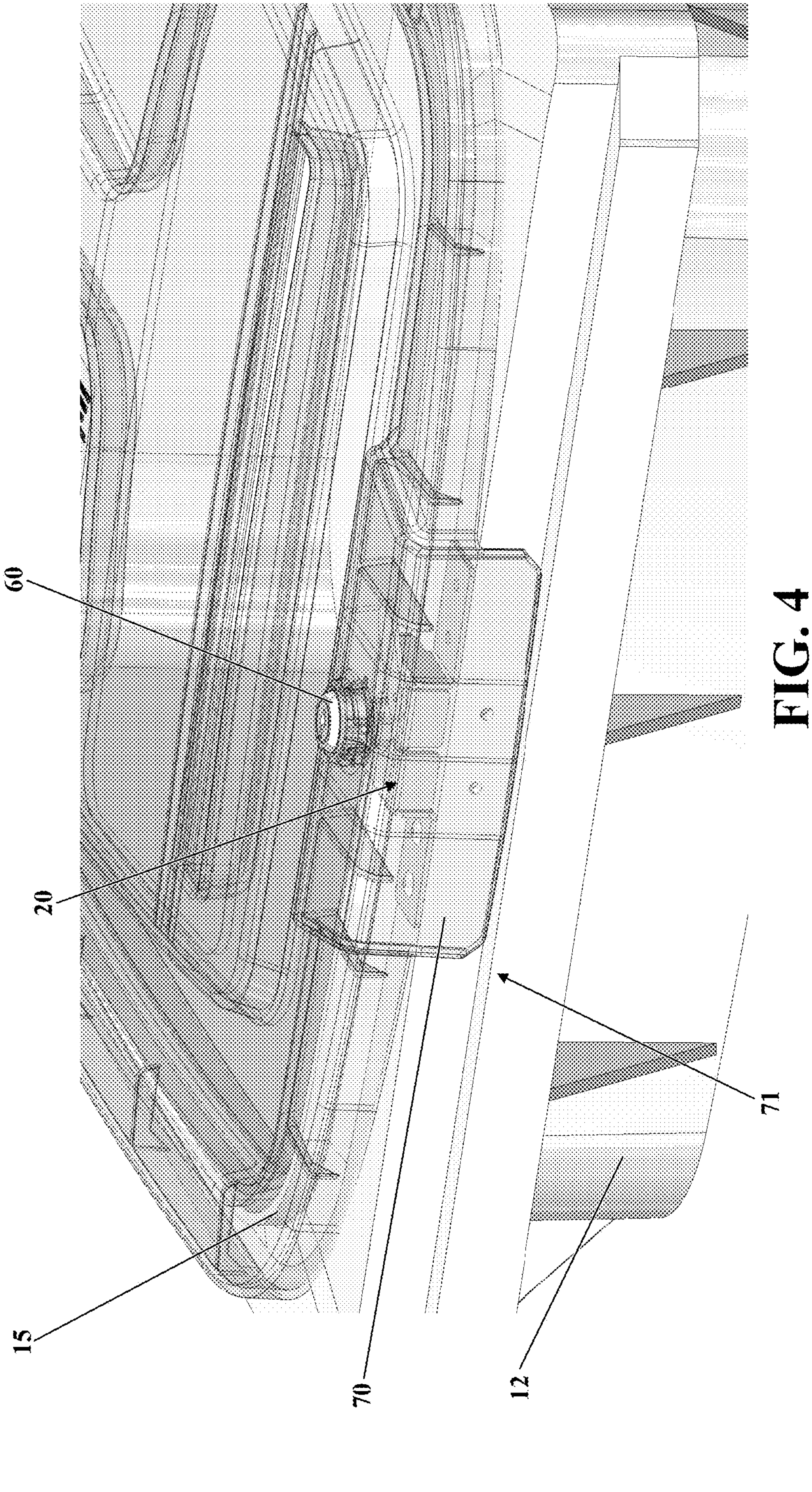
FIG. 4 is a perspective view of the system of FIG. 1A with the lid being shown closed and transparent.
Figure 5:
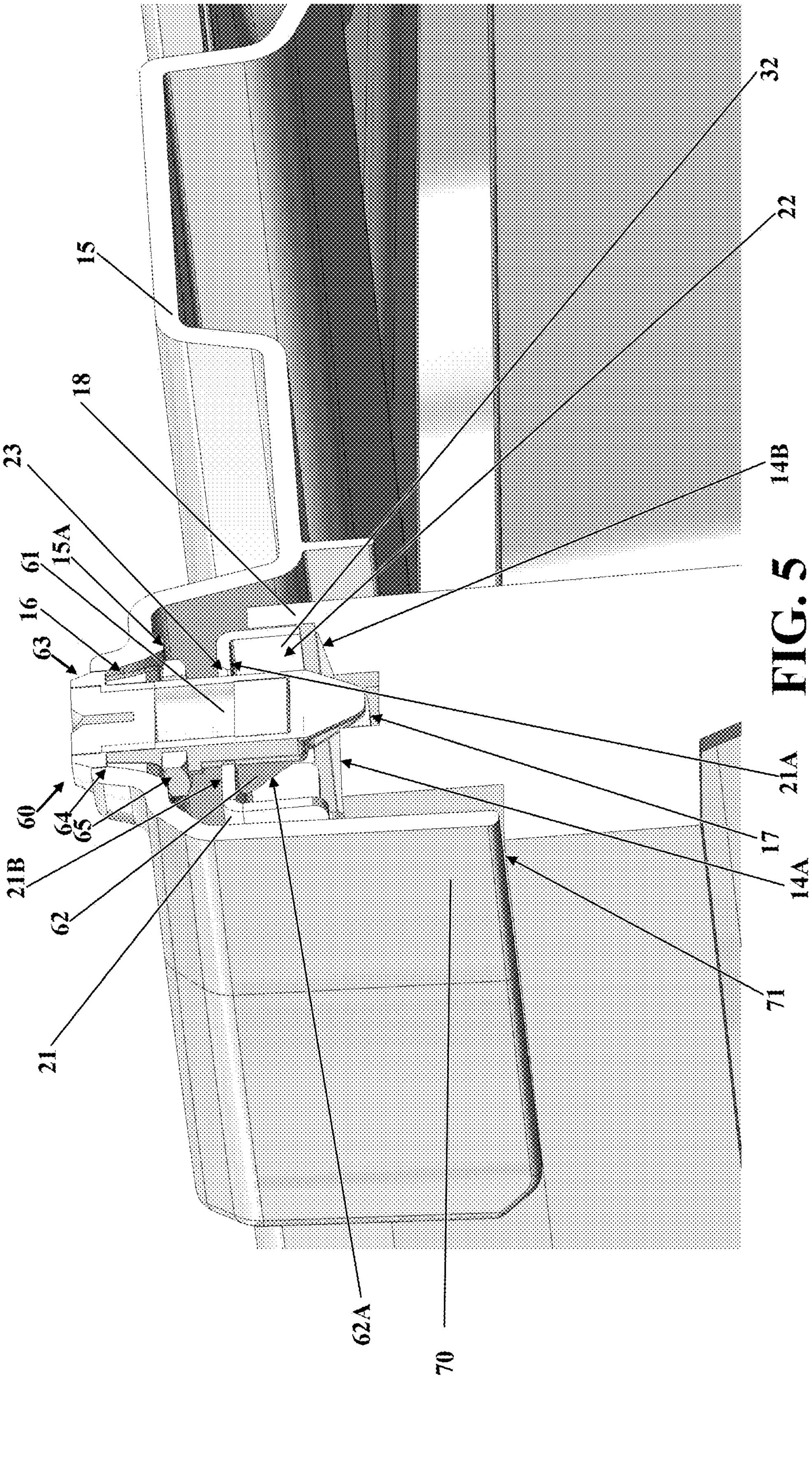
FIG. 5 is a cross-sectional perspective view of the system of FIG. 1A with the lid being shown closed.

Alternatively, lid 15 may be locked closed with a lock 60 coupled to lid 15 as shown in FIGS. 4 and 5. In the illustrated embodiment, lock 60 includes a body 61 extending at least partially through lid aperture 16. At least one locking member 62 extends outwardly from body 61. To lock lid 15 closed, the at least one locking member 62 is positioned within open chamber 22. Engagement of the at least one locking member 62 with a bottom surface 21A of raised portion 21 of bracket 20 at least partially prevents opening of lid 15 thereby locking lid 15 closed. In some embodiments, lock 60 is installed such that the at least one locking member 62 is separated from gap 24 so that the at least one locking member 62 may engage bottom surface 21A. Rim 14 may include a cavity 17. Cavity 17 may at least partially receive body 61 of lock 60.

In the embodiment illustrated by FIG. 5, lock 60 is a snap or slam lock configured to automatically lock lid 15 once lid 15 is closed. In such embodiments, the at least one locking member 62 is biased to extend out. Upon closing of lid 15, the at least one locking member 62 is pushed inward by bracket 20 as the biasing member passes through bracket aperture 23. Upon passing through bracket aperture 23, the at least one locking member 62 is again biased outwardly from body 61 and the biasing member prevents retraction of the at least one locking member 62 into body 61. Engagement of the at least one locking member 62 with bottom surface 21A of raised portion 21 at least partially prevents removal of body 61 through bracket aperture 23 and therefore at least partially prevents opening of lid 15. To unlock such lock 60, a key may be used to manually retract the at least one locking member 62 into body 61.

In the illustrated embodiment, a bottom surface 62A of the at least one locking member 62 is sloped. Engagement of the sloped bottom surface 62A with the top surface 21B of raised portion 21 as body 61 is inserted into bracket aperture 23 at least partially retracts the at least one locking member 62 into body 61. In some embodiments, a periphery 23A of bracket aperture 23 is at least partially sloped (e.g. chamfered as shown in FIG. 6). In some embodiments, the slope of bottom surface 62A is generally the same as the slope of periphery 23A of bracket aperture 23. In some embodiments, the slope of bottom surface 62A and/or the slope of periphery 23A of bracket aperture 23 is about 45°.

In the embodiment illustrated in FIG. 5, a head portion 63 of lock 60 has a diameter which is greater than the diameter of body 61 of lock 60. When lock 60 is installed through lid aperture 16, head portion 63 abuts a seat 64 located within lid aperture 16. A fastening member 65 engages an inner surface 15A of lid 15 thereby preventing lock 60 from being removed from lid aperture 16. Fastening member 65 may include a nut, a leaf spring, a bracket and/or the like. Other means of securing or coupling lock 60 to lid 15 may be used and are within the scope of present disclosure.

In some embodiments, lock 60 may be coupled to bracket 20 and/or container 12 and configured to lock with a portion of lid 15 when lid 15 is closed.

In some embodiments, lock 60 includes a cylindrical lock. In some such embodiments, the at least one locking member 62 may be extended from and retracted into body 61 manually with a key inserted into the lock.

Other lock configurations of lock 60 are possible and included within the present disclosure.

Embodiments of a bracket according to the present disclosure, such as bracket 20, enable a user to choose a desired locking mechanism, namely a lock, such as a slam lock, or a hasp plate and padlock combination. The configuration of the bracket, such as bracket 20, allows a user to install either a hasp plate or a lock. This optionality may be beneficial to allow users to configure the container as desired. Positioning and configuration of the bracket, such as bracket 20, may also allow relatively simple installation of either the hasp plate or the lock.

Thus, in the illustrated embodiment, where lock 60 is present, hasp plate 40 is removed from container 12 or omitted entirely from system 10.

In some embodiments, a plurality of containers 12 are stacked, each container having a respective bracket 20 secured thereon. This may allow a user to position and secure a hasp plate 40 to each of the containers 12 as desired even while containers 12 are stacked.

Referring now to FIGS. 6 to 13, an example embodiment of bracket 20 is shown. In the illustrated embodiment, raised portion 21 is connected to and extends between a first base portion 25 and a second base portion 26. A bottom surface 21A of raised portion 21 is at least partially elevated from a bottom surface 25A of first base portion 25 and a bottom surface 26A of second base portion 26. In the illustrated embodiment, first and second base portions 25 and 26 are rectangular and bottom surfaces 25A and 26A are planar. In other embodiments, first and second base portions may have different shapes or configurations.

In the illustrated embodiment, first and second base portions 25 and 26 secure bracket 20 to container 12. For example, one or more fasteners may pass through first base portion 25 and one or more fasteners may pass through second base portion 26 to secure bracket 20 to container 12. First and second base portions 25 and 26 may comprise one or more base openings 27 through which corresponding bracket fasteners 28 may pass. Base openings 27 and/or bracket fasteners 28 need not all be the same. In the illustrated embodiment, base openings 27 are circular. Other methods of securing first and second base portions 25 and 26, and thus bracket 20, to container 12 are possible and included within the present disclosure.

In the illustrated embodiment, first and second base portions 25 and 26 extend from respective front edge, which are co-linear with each other and parallel to a front of bracket 20, towards respective distal back edges. However, the back edges are spaced from the back of bracket 20 and first and second base portions do not extend fully to the back of bracket 20. Thus, a width or a depth of each of first base portion 25 and/or second base portion 26 may be less than a width and/or depth of raised portion 21. For example, a portion 14A of rim 14 to which bracket 20 is secured to may be generally planar while another portion 14B of rim 14 is sloped (e.g. as shown in FIG. 5). In such example, the first and second base portions 25 and 26 having a width that is less than the width of raised portion 21 and generally planar bottom surfaces 25A and 26A allows the first and second base portions 25 and 26 to be secured flush against portion 14A of rim 14 which is not sloped (i.e. is planar). In such example, first and second base portions 25 and 26 have a width that is the same as or less than a width of portion 14A of rim 14. First and second base portions 25 and 26 need not have the same width. In some embodiments, a surface profile of bottom surface 25A and/or bottom surface 26A corresponds at least partially to a surface profile of rim 14. For example, if the surface profile of rim 14 is partially sloped, then bottom surface 25A and/or bottom surface 26A may be partially sloped to match the surface profile of rim 14.

In the illustrated embodiment, raised portion 21 includes side walls 29 and 30, a front wall 31 and a rear wall 32. In the illustrated embodiment, raised portion 21 is generally rectangular having a planar upper surface 21B. Side walls 29 and 30, front wall 31 and rear wall 32 are generally orthogonal to upper surface 21B. In such embodiment, open chamber 22 generally corresponds to a rectangular prism. One or more edges of upper surface 21B may be a half bullnose edge. Side wall 29 is generally orthogonal to first base portion 25 and side wall 30 is generally orthogonal to second base portion 26. Side walls 29 and 30 connect upper surface 21B to respective first and second base portions 25 and 26.

In the illustrated embodiment, gap 24 extends through front wall 31 to a lower end 36 of front wall 31 to form a continuous gap in raised portion 21. As shown in the illustrated embodiment, front wall 31 may not extend to a bottom of bracket 20 in order for there to be sufficient space between end 36 of front wall 31 and rim 14 for hasp plate 40 to be positioned within open chamber 22 (i.e. a distance from the end 36 of front wall 31 to rim 14 is greater than a thickness of a base portion of hasp plate 40, described further below).

It will be understood that in embodiments where the gap in the raised portion extends from the bracket aperture in a different direction, the gap will pass through any walls or edge of the raised portion to allow for communication between the bracket aperture and the exterior of the bracket to permit insertion of the hasp plate.

Rim 14 may comprise a lip 18 as shown in FIGS. 1A-5. Bracket 20 may abut lip 18. In some embodiments, rear wall 32 abuts lip 18.

A notch 33 may extend from bracket aperture 23. Notch 33 may be positioned opposite gap 24. Notch 33 may be configured to partially receive staple portion 41 of hasp plate 40 when hasp plate 40 is positioned within open chamber 22 (as shown in e.g. FIGS. 25-30). Additionally, or alternatively, staple portion 41 may partially remain within gap 24 when hasp plate 40 is positioned within open chamber 22 (as shown in e.g. FIG. 25-30). Staple portion 41 being partially positioned within gap 24 and/or notch 33 when hasp plate 40 is positioned within open chamber 22 may align hasp plate 40 relative to bracket 20 and may at least partially prevent movement or rotation of staple portion 40 relative to bracket aperture 23, etc.

In the illustrated embodiment, gap 24 (and notch 33) are orthogonal to a front edge 37 of raised portion 21. Other positions and/or orientations of gap 24 (and notch 33) are possible and included within the present disclosure. In some embodiments, gap 24 extends to a rear edge of raised portion 21. In the illustrated embodiment, gap 24 has a constant width. However, gap 24 need not have a constant width.

Referring to FIGS. 14 to 20, an example embodiment of hasp plate 40 is shown. In the illustrated embodiment, hasp plate 40 includes a base portion 43. Base portion 43 may include a bottom surface 43A that is generally complementary to a top surface of rim 14 (e.g. if a top surface of rim 14 is generally planar, then the bottom surface of base portion 43 may be generally planar). Base portion 43 may have a width that is less than the width of raised portion 21, open chamber 22 or rim 14. For example, base portion 43 may have a width that is the same as or less than a width of first or second base portions 25, 26 of bracket 20. In the illustrated embodiment, base portion 43 has a width that is less than a width of the opening created by the spacing between end 36 of the first wall 31 and rim 14 to facilitate insertion of hasp plate 40 into chamber 22.

More generally, has plate 40 may be sized and dimensioned to be slid into chamber 22. For example, in the illustrated embodiment, staple portion 41 extends at a right angle from base portion 43 and at a position that permits the base portion 43 to be passed through (e.g. slid through) a space between first wall 31 and rim 14, while permitting the staple portion 41 to be passed through (e.g. slid through) gap 24.

In some embodiments, base portion 43 has a width that is the same as or less than a width of portion 14A of rim 14 (e.g. the portion of rim 14 which is generally planar allowing base portion 43 to be positioned flush against).

Additionally, hasp plate 40 includes a wall 44 extending downwards from base portion 43. Wall 44 may secure hasp plate 40 to container 12 (or rim 14 of container 12). In some embodiments hasp plate 40 is secured to a front surface of container 12 proximal to bracket 20. For example, one or more fasteners may pass through wall 44 into a front surface of container 12. Wall 44 may comprise one or more wall openings 45 through which hasp plate fasteners 46 may pass. Wall openings 45 and/or hasp plate fasteners 46 need not all be the same. In the illustrated embodiment, wall openings 45 are circular. Other methods of securing wall 44 (or hasp plate 40) to container 12 are possible and included within the present disclosure.

As shown in the illustrated embodiment, a width of staple portion 41 may taper (i.e. a width of staple portion 41 proximal to base portion 43 may be greater than a width of staple portion 41 proximal to staple opening 42). In some embodiments, the taper of staple portion 41 allows staple portion 41 to extend through lid aperture 16 when lid 15 is closed. In some embodiments, staple opening 42 partially extends above lid aperture 16 when lid 15 is closed. In some embodiments, staple opening 42 extends completely above lid aperture 16 when lid 15 is closed.

Staple portion 41 and/or wall 44 may be generally orthogonal to base portion 43. As shown in the illustrated embodiment, staple portion 41 may be orthogonal to base portion 43 and wall 44. Staple portion 41 and wall 44 may also be orthogonal to each other. When secured to container 12 (e.g. as shown in FIGS. 2 and 3), base portion 43 may be generally parallel to rim 14 and staple portion 41 and wall 44 may be generally orthogonal to rim 14.

Figure 21:
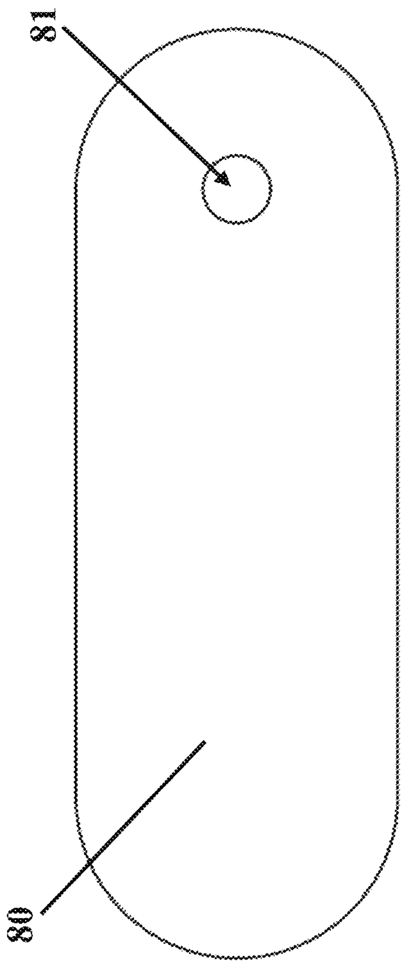
FIG. 21 is a top view of a cover plate of the system of FIG. 1A.
Figure 22:
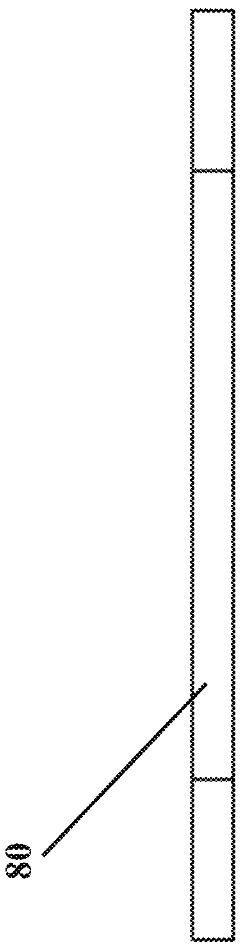
FIG. 22 is a side view of the cover plate of FIG. 21.

A cover plate 80 may be coupled to bracket 20. Cover plate 80 may be positioned to at least partially cover bracket aperture 23. At least partially covering bracket aperture 23 may, for example, prevent lid 15 from inadvertently being locked closed when lock 60 is installed. Additionally, or alternatively, covering bracket aperture 23 at least partially with cover plate 80 may prevent (or at least reduce) entry of debris into open chamber 22. In the embodiment illustrated in FIGS. 21 and 22, cover plate 80 is generally rectangular and includes rounded corners. Cover plate 80 may include an opening 81. A fastener may, for example, pass through opening 81 to couple cover plate 80 to bracket 20. Bracket 20 may include an opening 35 through which such fastener may pass through when coupling cover plate 80 to bracket 20. Cover plate 80 is optional and need not be present in all embodiments of the invention.

Figure 23:
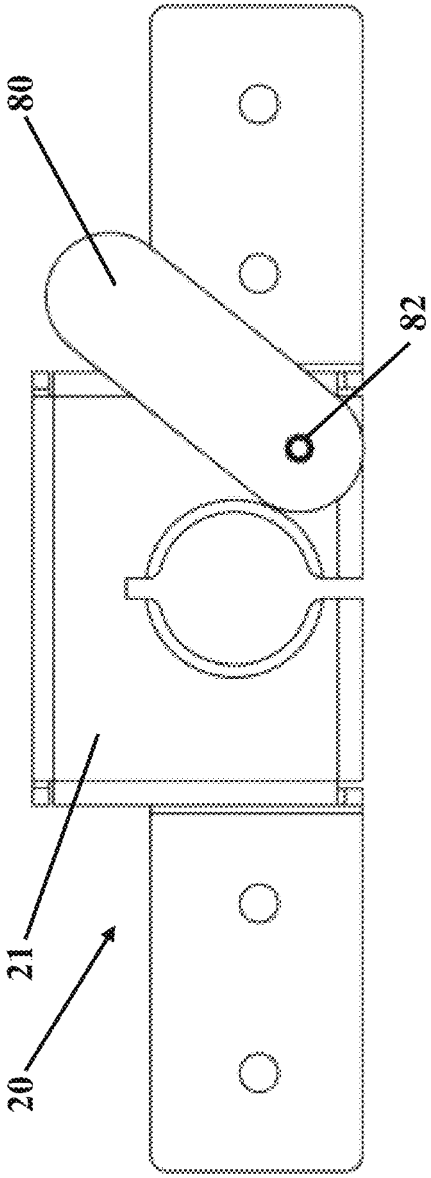
FIG. 23 is a top view of an example assembly having a bracket and a cover plate.
Figure 24:
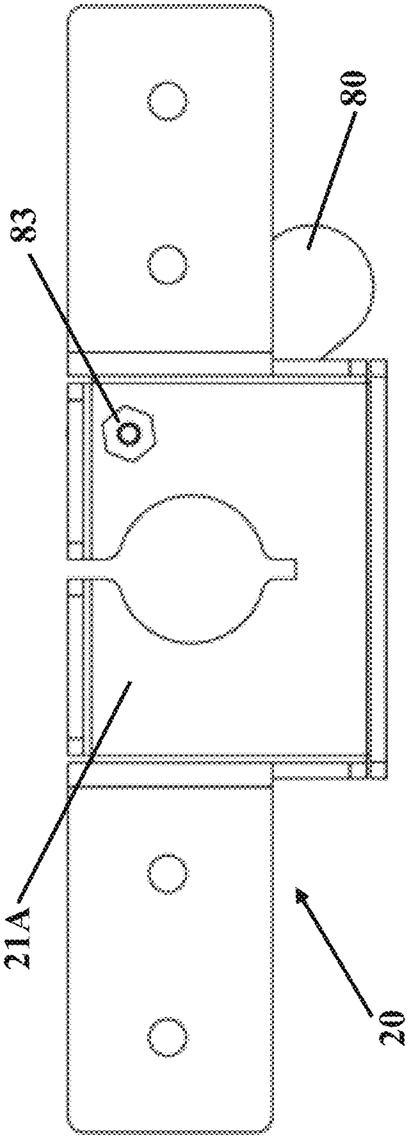
FIG. 24 is a bottom view of the assembly of FIG. 23.
Figure 26:
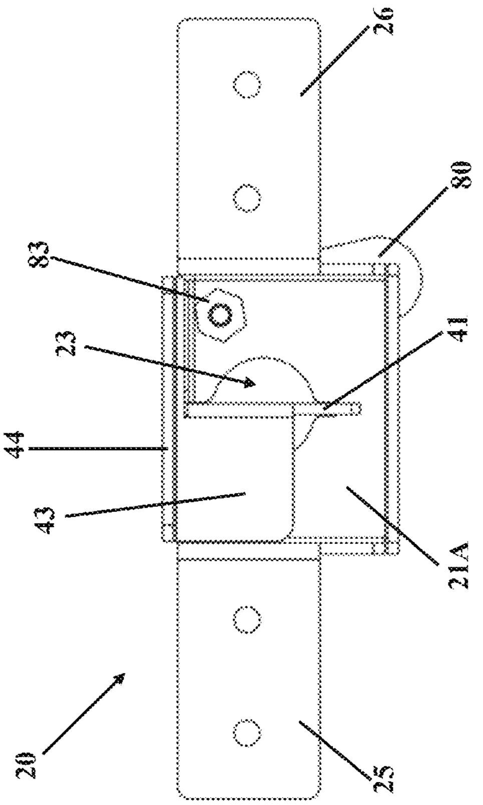
FIG. 26 is a bottom view of the assembly of FIG. 25.
Figure 25:
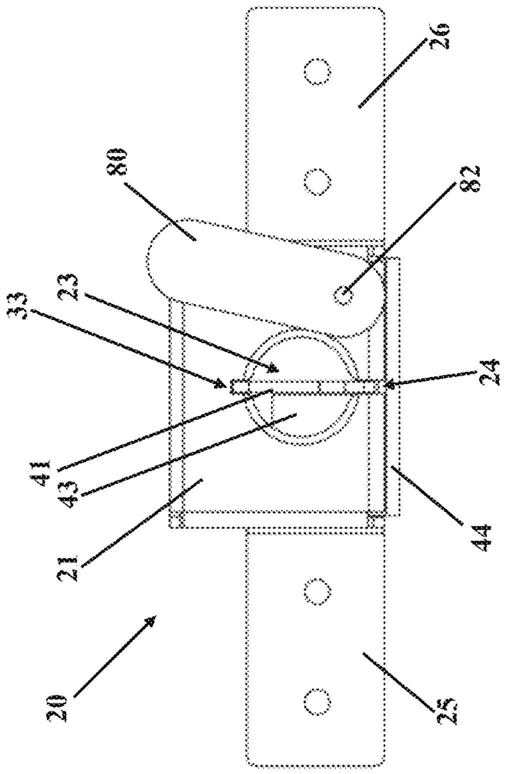
FIG. 25 is a top view of an example assembly having a bracket, a hasp plate and a cover plate.
Figure 28:
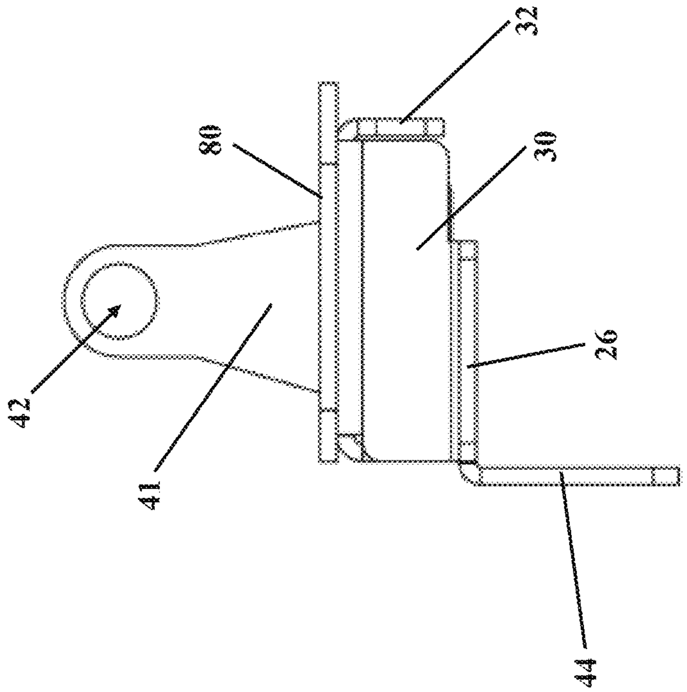
FIG. 28 is a right side view of the assembly of FIG. 25.
Figure 27:
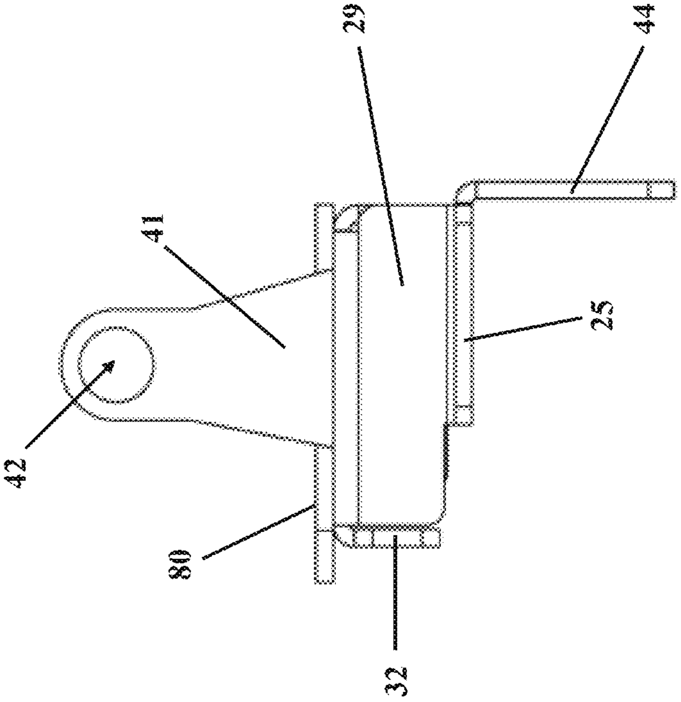
FIG. 27 is a left side view of the assembly of FIG. 25.

FIGS. 23 and 24 illustrate an example assembly including a cover plate 80 rotatably coupled to raised portion 21 of bracket 20. FIGS. 25 to 30 illustrate an example assembly including a hasp plate 40, a bracket 20 and a cover plate 80 rotatably coupled to raised portion 21 of bracket 20. A fastener 82 and nut 83 may rotatably couple cover plate 80 to raised portion 21 of bracket 20. Other methods of coupling cover plate 80 to bracket 20 (or raised portion 21 of bracket 20) are possible and included within the present disclosure.

Figure 30:
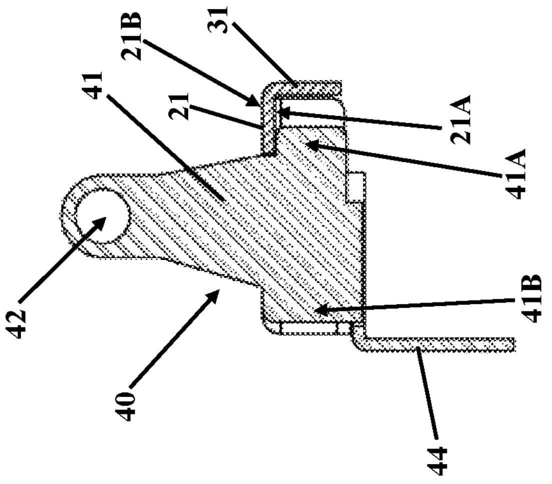
FIG. 30 is a cross-sectional view of the assembly of FIG. 25 along line B-B in FIG. 29.
Figure 29:
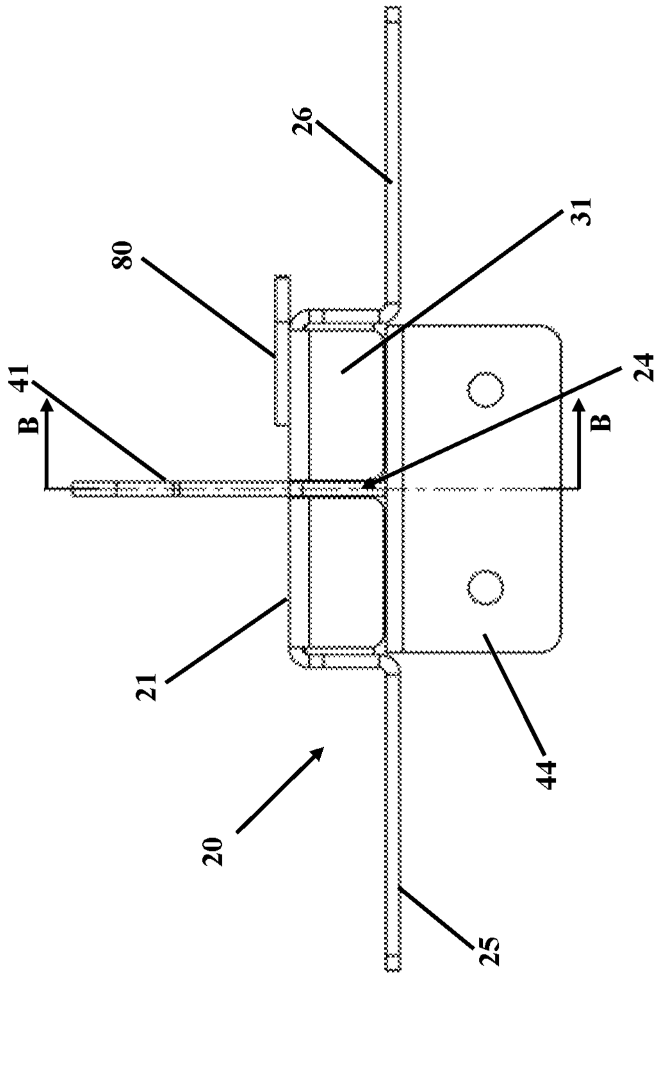
FIG. 29 is a front view of the assembly of FIG. 25.

As shown in FIG. 30, an end 41A of staple portion 41 may at least partially abut bottom surface 21A of raised portion 21. End 41B of staple portion 41 may be flush with a top surface 21B of raised portion 21. In the illustrated embodiment, end 41A or another portion of staple portion 41 is received within notch 33 and end 41B is received within gap 24. As described above, positioning hasp plate 40 as shown in FIG. 30 may align hasp plate 40 relative to bracket 20 as hasp plate 40 is positioned and may at least partially prevent movement or rotation of staple portion 41 relative to bracket aperture 23.

Figure 31:
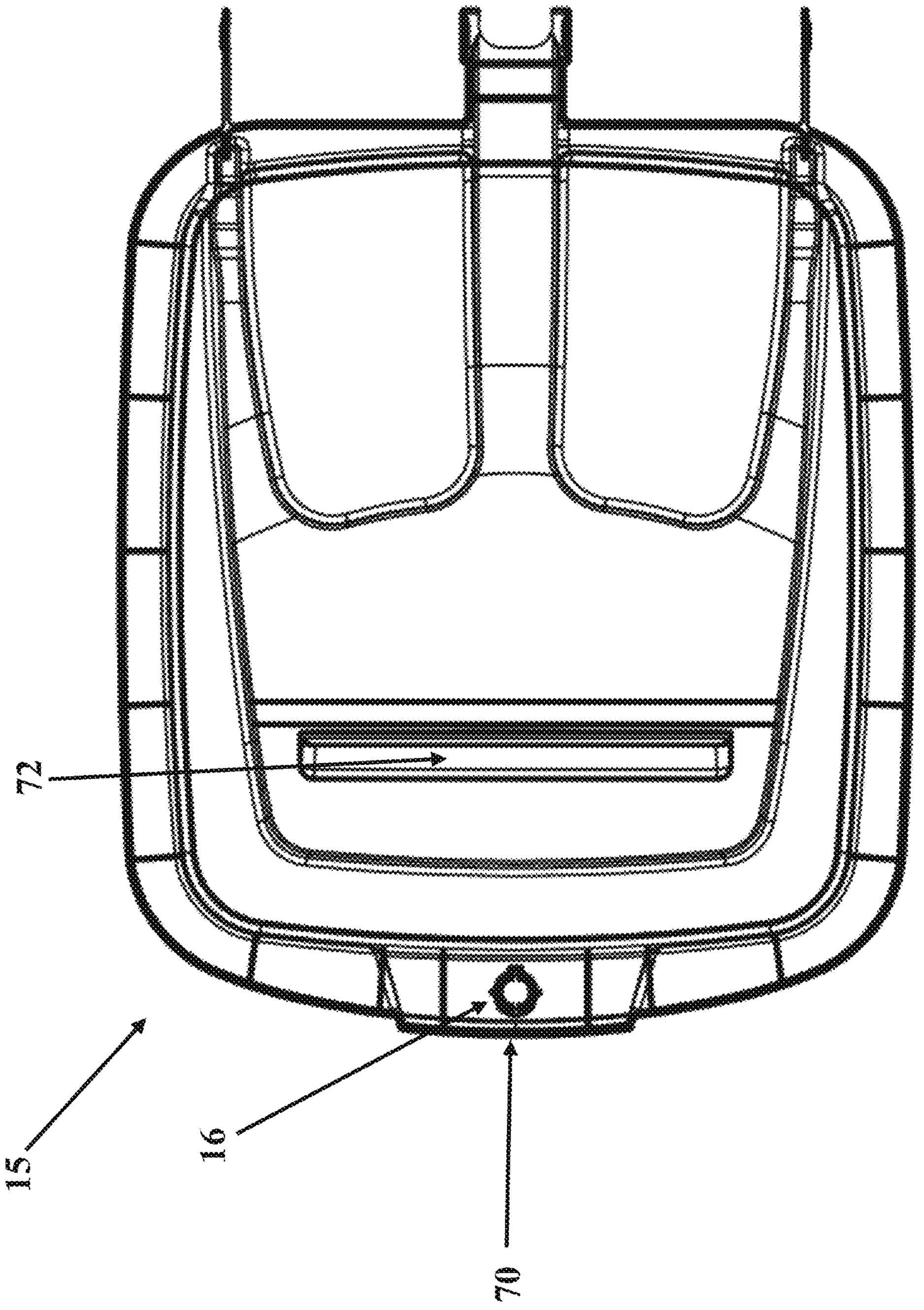
FIG. 31 is a top view of a lid of the system of FIG. 1A.
Figure 32:
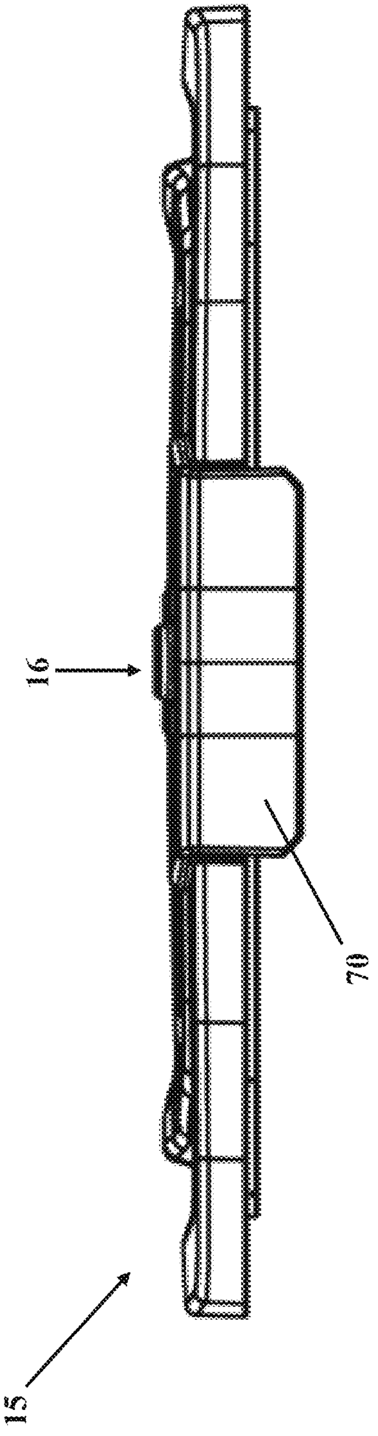
FIG. 32 is a front view of the lid of FIG. 31.
Figure 33:
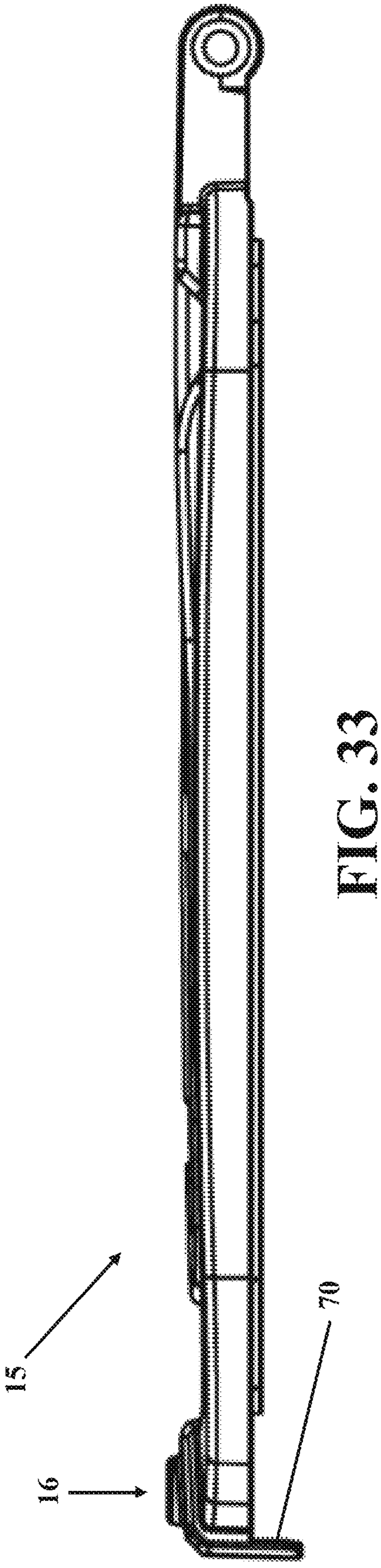
FIG. 33 is a right side view of the lid of FIG. 31.

Referring to FIGS. 31 to 33, an example embodiment of a lid 15 is shown. Lid 15 may at least partially cover bracket 20 and hasp plate 40 when lid 15 is closed. In the illustrated embodiment, lid 15 includes a cover portion 70 which completely covers a front of bracket 20 and hasp plate 40 (if included) when lid 15 is closed. Cover portion 70 additionally covers hasp plate fasteners 46. In some embodiments, cover portion 70 at least partially covers bracket 20 and hasp plate 40 (if included) when lid 15 is closed. Cover portion 70 may improve security of the container 12 by preventing or hindering access to hasp plate 40 and/or bracket 20. Thus, as shown in the illustrated embodiment, cover portion 70—and more generally lid 15—may be sized to obscure and surround both wall 44 of hasp plate 40 and first and second base portions 25 and 26 of bracket 20. Additionally, when lid 15 is closed, cover portion 70 may rest flush against a protruding step-down portion 71 of rim 14 (e.g. as shown in FIGS. 3 and 5). Cover portion 70 resting flush against a step-down portion may at least partially prevent or hinder forceful prying of cover portion 70 away from rim 14 to improve overall security of container 12.

In some embodiments, lid 15 includes at least one opening 72 through which matter, such as documents to be shredded, may be inserted into container 12 when lid 15 is closed (and possibly locked). While a elongated slot is shown for opening 72, other configurations, placements, shapes etc. of opening 72 are possible.

Although container 12 has been illustrated without wheels, container 12 may include wheels.

Numerous specific details have been set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a nonexclusive inclusion. For example, a composition, a process, method, article, or apparatus that comprises a list of elements is not necessarily limited to only those elements but may include other elements not expressly listed or inherently present therein.

As used herein the terms "approximately," "about," "substantially" and variations thereof are intended to include not only the exact value qualified by the term, but to also include some slight deviations therefrom, such as deviations caused by measuring error, manufacturing tolerances, wear and tear on components or structures, stress exerted on structures, and combinations thereof, for example.

Use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Moreover, it will be understood that features of one embodiment may be combined with features of other embodiments, even if not expressly recited or described as a combination.

The invention claimed is:

1. A container system comprising:

a container having an opening with a rim;

a lid for covering the opening, the lid being movable between an open position and a closed position in which the lid covers the opening; and a bracket secured to the rim, the bracket having a raised portion spaced from the rim and defining an open chamber between the raised portion and the rim, wherein the raised portion includes a bracket aperture that is positioned to be aligned with a corresponding lid aperture in the lid when the lid is in the closed position, and wherein a gap in the raised portion extends from the bracket aperture to an edge of the raised portion.

2. The system of claim 1, further comprising a hasp plate having a staple portion, the hasp plate being positionable within the chamber by passing the staple portion through the gap, wherein the staple portion extends through the bracket aperture and the lid aperture when the hasp plate is fully positioned within the chamber and the lid is in the closed position.

3. The system of claim 1, further comprising a lock couplable to the lid, the lock engageable with the raised portion of the bracket to lock the lid closed when the lid is in the closed position.

4. The system of claim 3, wherein the lock comprises a slam lock.

5. The system of claim 1, wherein the bracket comprises a first base portion and a second base portion, the raised portion connected to and extending between the first and second base portions.

6. The system of claim 5, wherein the first and second base portions secure the bracket to the container.

7. The system of claim 2, wherein the bracket comprises a notch extending from the bracket aperture, the staple portion of the hasp plate at least partially insertable within the notch.

8. The system of claim 1, wherein a periphery of the bracket aperture is at least partially sloped.

9. The system of claim 2, wherein the raised portion of the bracket comprises a first wall extending downwards from the edge of the raised portion and the gap extends through the first wall.

10. The system of claim 9, wherein the first wall is spaced from the rim.

11. The system of claim 9, wherein the raised portion of the bracket comprises a second wall extending downwards from the raised portion opposite the first wall, the second wall abutting a lip of the rim of the container.

12. The system of claim 2, wherein the hasp plate comprises a base portion and a wall extending downwards from the base portion, the wall configured to secure the hasp plate to the container, the staple portion orthogonal to the base portion.

13. The system of claim 2, wherein the staple portion is tapered.

14. The system of claim 2, wherein the hasp plate is secured to a front surface of the container proximal to the bracket.

15. The system of claim 2, wherein the lid is configured to hinder access to the bracket and hasp plate when the lid is in the closed position.

16. The system of claim 15, wherein the lid comprises a cover portion configured to cover a front of the bracket and a front of the hasp plate.

17. The system of claim 1, further comprising a cover plate rotatably coupled to the raised portion of the bracket, the cover plate rotatable to at least partially cover the bracket aperture.

18. A bracket for a container system comprising:

a first base comprising a first bottom surface;

a second base comprising a second bottom surface, the second base spaced apart from the first base; and a raised portion connected to the first and second bases and extending between the first and second bases, the raised portion comprising:

a third bottom surface at least partially elevated from each of the first and second bottom surfaces, a bracket aperture, and a gap extending through the raised portion from the bracket aperture to an edge of the raised portion.

19. The bracket of claim 18, wherein the raised portion further comprises a wall extending from the edge of the raised portion, the gap extending through the wall.

20. The bracket of claim 19, wherein an end of the wall is elevated with respect to each of the first and second bottom surfaces.

21. The bracket of claim 18, wherein the raised portion further comprises a notch extending from the bracket aperture.

22. The bracket of claim 21, wherein the notch is opposite the gap.

23. The bracket of claim 18, wherein a periphery of the bracket aperture is at least partially sloped.

* * * * *